United States Patent [19]
McNelis et al.

[11] Patent Number: 5,241,518
[45] Date of Patent: Aug. 31, 1993

[54] METHODS AND APPARATUS FOR DETERMINING THE TRAJECTORY OF A SUPERSONIC PROJECTILE

[75] Inventors: Niall B. McNelis, Baltimore, Md.; Nelson O. Conner, Mason Neck, Va.

[73] Assignee: AAI Corporation, Cockeysville, Md.

[21] Appl. No.: 836,601

[22] Filed: Feb. 18, 1992

[51] Int. Cl.⁵ .............................................. G01S 5/18
[52] U.S. Cl. ..................................... 367/127; 367/906
[58] Field of Search ................ 367/906, 127, 124, 118, 367/129; 434/16, 17, 18, 19; 273/372

[56] References Cited

U.S. PATENT DOCUMENTS

| | | | |
|---|---|---|---|
| 3,445,808 | 5/1969 | Johnson | 367/127 |
| 3,585,497 | 6/1971 | Dalzell | 273/373 |
| 3,656,056 | 4/1972 | Dalzell, Jr. | 273/373 |
| 4,323,993 | 4/1982 | Soderblom et al. | 367/906 |
| 4,351,026 | 9/1982 | Phillips | 367/906 |
| 4,514,621 | 4/1985 | Knight et al. | 367/906 |
| 4,659,034 | 4/1987 | Diekmann | 367/906 |
| 4,805,159 | 2/1989 | Negendank et al. | 367/906 |
| 4,885,725 | 12/1989 | McCarthy et al. | 367/906 |
| 5,025,424 | 6/1991 | Rohrbaugh | 367/906 |

*Primary Examiner*—Daniel T. Pihulic
*Attorney, Agent, or Firm*—Griffin, Butler, Whisenhunt & Kurtossy

[57] ABSTRACT

Apparatus and method for determining the trajectory of a supersonic projectile of unknown velocity and direction having at least three spaced-apart sensors capable of encountering a shock wave generated by a supersonic projectile passing in the vicinity of the sensors and capable of generating signals in response to the shock wave, which signals are related to an azimuth and elevation angle of a unit sighting vector from each sensor to an origin of the shock wave. Means are provided for calculating from the signals the azimuth and elevation angle of the unit sighting vector from each sensor to the origin of the shock wave. Means are provided for calculating from the unit sighting vector of each of the three sensors, the azimuth and elevation angle of the local trajectory of the projectile.

36 Claims, 8 Drawing Sheets

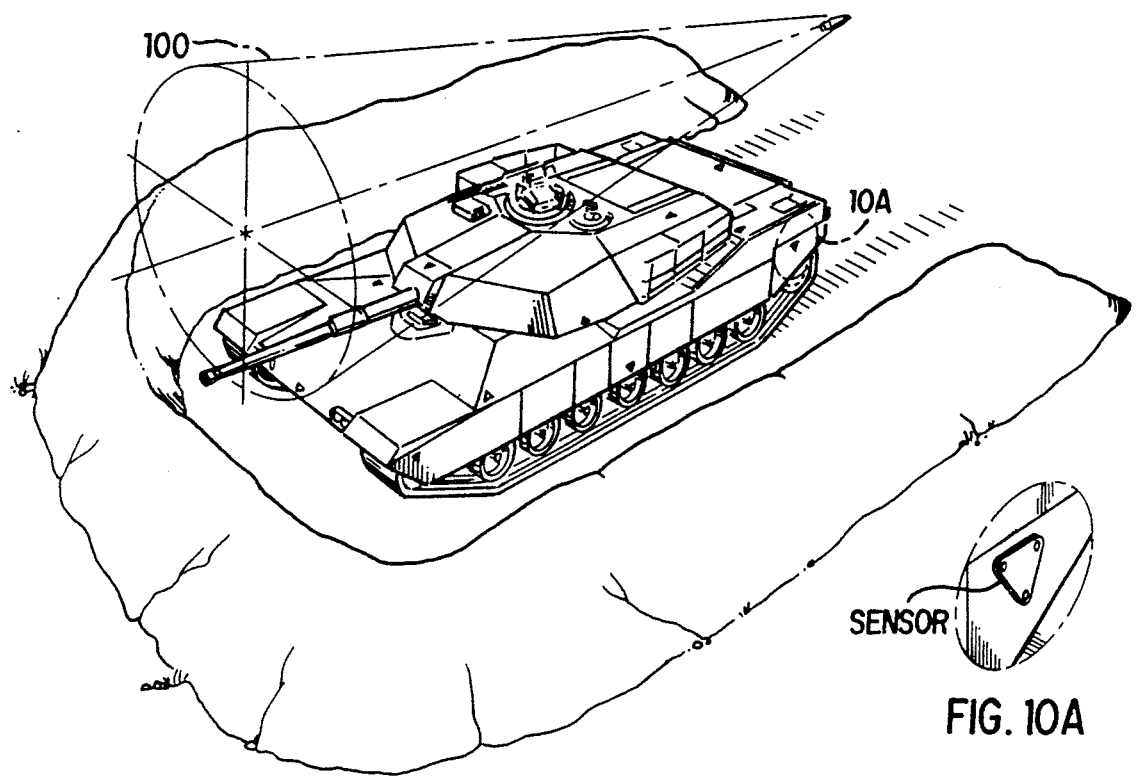
FIG. 10
FIG. 10A
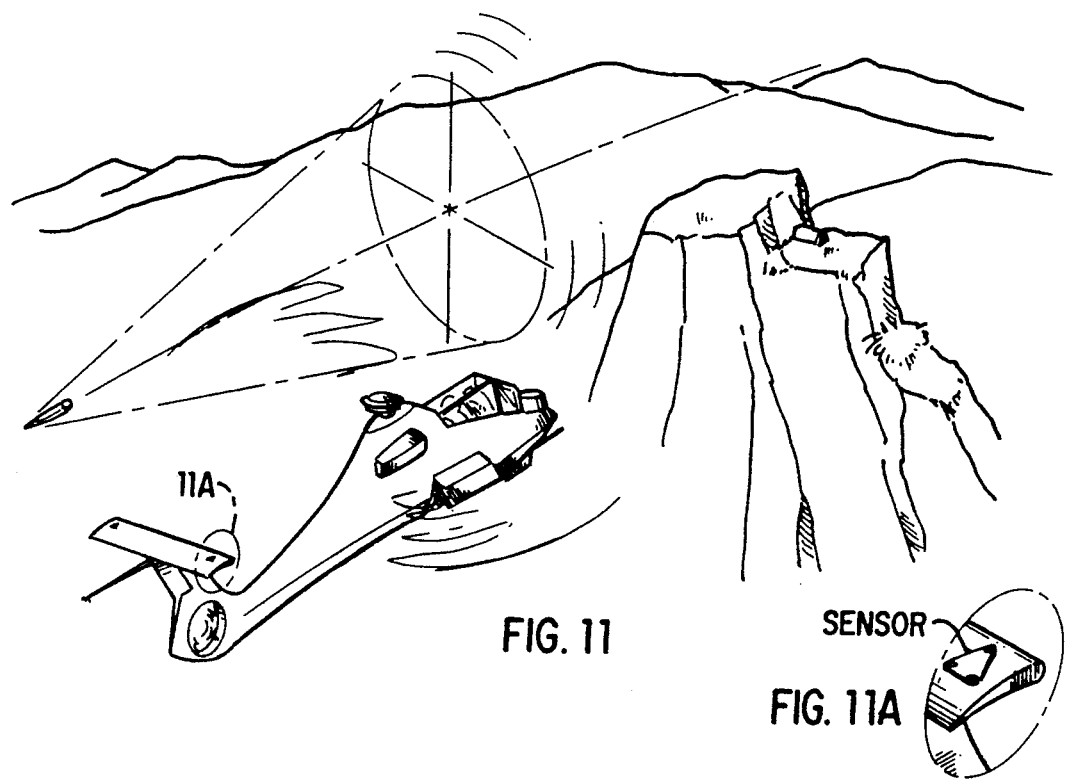
FIG. 11
FIG. 11A

METHODS AND APPARATUS FOR DETERMINING THE TRAJECTORY OF A SUPERSONIC PROJECTILE

The invention relates to method and apparatus for determining, among others, the trajectory, miss-distance and velocity of a supersonic projectile, and to determining the approximate firing position of such a projectile.

BACKGROUND OF THE INVENTION

The art has long recognized that acoustical means may be used for determining a portion of the trajectory of a projectile, and the art, generally, has used such acoustical means for locating the point at which a projectile passes into or near a training target for scoring the accuracy of small arms fire, in lieu of the more conventional paper targets. An example of the foregoing is U.S. Pat. No. 4,514,621. Basically, these devices operate by means of a grid of acoustical sensors in which the plane of the sensors is normal to the trajectory of the projectile, e.g. a rifle bullet. As the bullet passes through that grid of sensors, the sensors can locate the passage of the bullet through that grid of sensors by calculating the time delays of the sensors.

When two such grids are spaced apart, one behind the other, and the path of a bullet passes through both of the grids, a portion of the trajectory of a bullet may also be determined, and U.S. Pat. No. 3,445,808 is representative thereof. That patent also points out that if a such a dual grid system is deployed on a military vehicle, e.g. a helicopter, and enemy fire passes through the two spaced-apart grids, the general direction of the trajectory of that fire may be determined.

Similar methods for locating the passage of a bullet may use other types of sensors, such as electrical resistance elements, rather than acoustical transducers, and U.S. Pat. Nos. 3,585,497 and 3,656,056 are representative thereof.

Rather than using a grid of acoustical sensors, curved elongated hoops with acoustical transducers at ends thereof may be used. When a bullet passes within the vicinity of the curved hoops, the position of the bullet passing such curved hoops can be calculated, and U.S. Pat. No. 4,351,026 is representative thereof.

Curved hoops may also be used where the target is moving within a defined field normal to the hoops, and U.S. Pat. No. 5,025,424 is representative of that technology.

Somewhat similarly, U.S. Pat. No. 4,885,725 suggests a plurality of triangularly arrayed, mechanically connected acoustical transducers, instead of curved hoops, for determining the point in which a bullet passes the target area and for providing some indication of the velocity of that bullet.

The foregoing patents are, primarily, directed toward training devices for scoring the accuracy of a trainee's fire, although, as mentioned above, U.S. Pat. No. 3,445,808 suggests the use of double acoustical grids for determining the general direction of enemy fire toward a military device, such as a helicopter.

Further, U.S. Pat. No. 4,659,034 suggests the use of a plurality of transducers disposed on a movable (towed) target and, by use of the transducers, determining the accuracy of fire toward that target. That accuracy of fire includes how close the projectile comes to the towed target (referred to as the miss-distance). U.S. Pat. No. 4,323,993 similarly determines a miss-distance by acoustical transducers, and, particularly, in this patent the miss-distance is calculatable even though the projectile misses the towed target altogether.

U.S. Pat. No. 4,805,159 provides a method for estimating the miss-distance between a projectile and a movable training target. In making such estimation, at least a portion of the trajectory of the projectile is also estimated. However, as that patent points out, the estimations of at least a portion of the trajectory of the projectile involves a number of possible estimates of the actual projectile path, and to eliminate erroneous estimates, additional transducers are used for consecutively selecting true estimates from erroneous estimates.

Thus, in general, the prior art, mainly, uses sensors, especially acoustical transducers, in various spatial arrangements for determining the miss-distance of a projectile passing through or near a target. Some of these systems in the art may provide a general direction of a local trajectory of the projectile, but these systems are not capable of providing accurate information as to the entire path of the projectile, and, hence, the position of the source of that projectile. In addition, these prior art systems, whatever their configuration, must have pre-knowledge of the direction and/or the velocity of the projectile, in order to determine the local trajectory of the projectile.

Thus, the prior art systems are useful essentially only in training exercises where either or both of the direction or velocity of the projectile is known, and such systems have essentially only been employed in such exercises. Thus, the systems are not applicable to battlefield conditions where it is important to know essentially the entire direction of the trajectory of a projectile, the miss-distance of that projectile, the approximate caliber or mass of that projectile, and the approximate origin of the source of that projectile, and under conditions where the velocity and/or direction of the projectile is unknown. All of this information is most useful in battlefield conditions where a military unit, under attack, cannot visually or by other human senses determine the direction, miss-distance, caliber and source of enemy fire.

This is often the case in modern warfare. For example, in modern tank warfare, the battlefield may span many kilometers, and incoming enemy fire, for example, shell fire, is confused with other background battle noises and noises produced by friendly fire. For example, a tank commander may hear the distinctive sounds of a near-miss enemy shell, but in the confusion of battle noises, the tank commander may not be able to determine either an approximate azimuth or elevation of the trajectory of that enemy shell. Thus, the tank commander cannot determine whether the shell is being fired from a long distance, or a very short distance, or whether the fire is coming from the front, rear or sides, or even the approximate caliber of that shell fire. Without such information, for example, the tank commander cannot quickly and positively respond to such enemy fire, and the dangers of a near-miss previous shell can increase markedly with succeeding enemy shells, which makes return suppressing fire of utmost importance.

Also, the prior art devices are not capable of scoring training fire where the training fire is of unknown velocity and/or direction. This is usually the situation in maneuver training fire where, for example, moving and roving tanks are firing on a target, e.g. an obsolete tank.

As can, therefore, be appreciated, it would be of substantial advantage in the art to provide apparatus and methods for determining essentially the entire trajectory of a supersonic projectile of unknown velocity and direction, such as shell fire, or even small arms fire. That trajectory will provide the approximate position of the origin of that incoming enemy fire. In addition, when the miss-distance of such incoming enemy fire is calculated, the likelihood of additional and eminent more accurate enemy fire is determinable. This provides an opportunity for immediate and effective return suppressing fire. Further, it would be of advantage to provide such apparatus and methods which are also adaptable to maneuver training fire.

BRIEF SUMMARY OF THE INVENTION

The present invention is based on three primary and several subsidiary discoveries. Firstly, it was discovered that at least three spaced-apart sensors, which are positioned to encounter the shock wave generated by a supersonic projectile, can be constructed so as to generate signals in response to the shock wave which are related to the azimuth and elevation angle of a unit sighting vector from each sensor to the origin of the shock wave. Of course, a unit vector, while having direction, has no magnitude (distance in this case). Thus, the distance from each sensor to the origin of the shock wave and, hence, the trajectory remains unknown, and these unit sighting vectors could point to a large number of possible actual trajectories.

As a second and important discovery, it was found that, most surprisingly, each unit sighting vector makes the same angle with the trajectory no matter what the azimuth or elevation angle of the trajectory, so that instead of a number of possible trajectory solutions, only one actual trajectory solution may be calculated.

As a subsidiary discovery, it was found that such a sensor may be most conveniently constructed by three spaced-apart transducers, each of which are capable of sequentially generating a signal in response to sequential pressure on each transducer, created by the shock wave as it encounters each transducer. The three transducers in each sensor, therefore, produce a signal which is related to the azimuth and elevation angle of a unit sighting vector for each sensor, and with a combination of three such sensors, three accurate unit sighting vectors to the origin of the shock wave and hence the trajectory of the projectile can be determined.

In this embodiment, the unit sighting vectors of each sensor are determined by measuring the time when the shock wave encounters each of the transducers in a sensor, and this time relationship of the three transducers provides an accurate unit sighting vector from the sensor to the trajectory of the projectile. With the present important discovery that these unit sighting vectors form the same angle with the trajectory, the magnitude (distance in this case) of the unit sighting vectors can be calculated. With the magnitude being calculated, three points in space are, therefore, defined and these three points in space will, accordingly, define the azimuth and elevation angle of the local trajectory of the projectile under almost all circumstances.

As a subsidiary discovery, it was found that the portion of the shock disturbance best suited for such determinations is the leading edge (also called the shock front) and the best suited shock disturbance is the first shock wave received by the sensor (also called the main shock wave).

As a further subsidiary discovery, it was found that, while three sensors are necessary for determining the trajectory of the projectile, there are some very limited situations where three sensors cannot determine the trajectory, and for increased reliability of determining the trajectory, a plurality of more than three sensors, each projecting a like unit sighting vector from each of the plurality of sensors to the trajectory of the projectile, are used. In addition, it was found that while a plurality of such sensors may be so disposed, in certain circumstances, only selected ones of that plurality of sensors are better used for determining the trajectory of the projectile, rather than using all of the plurality of sensors for any one particular trajectory.

As a further most important primary discovery, it was found that, with the above arrangement of sensors, the velocity of the projectile may be determined, and, further, by determining the time lapse of the passing of the main shock front and an ambient density line of the projectile over the sensors, the length of the projectile can also be relatively accurately calculated. Further, in this regard, it was found that the intensity of the main shock front, normalized to the miss-distance, the projectile velocity, and the length of the projectile provide sufficient information so that, from known projectile characteristics, the likely projectile itself can be determined. By knowing the projectile (and hence its specific characteristics), and having determined its local velocity and the local trajectory, the entire trajectory can be calculated, and this provides a close approximation of the position of the origin of that projectile.

Accordingly, the miss-distance of the projectile can be determined; the trajectory of the projectile can be determined; the class of projectile or the projectile itself can be determined; and the approximate position of the origin of that projectile can be determined. With this determined information, for example, a tank commander could order effective suppressive fire against the source of that projectile, even in battlefield conditions where the projectile of interest is of previously unknown velocity and direction.

Thus, briefly stated, the present invention provides an apparatus for determining the trajectory of a supersonic projectile of unknown velocity and direction. In this apparatus, at least three spaced-apart sensors are capable of encountering a shock wave generated by a supersonic projectile passing in the vicinity of the sensors. The sensors are also capable of generating signals in response to the shock wave, which signals are related to an azimuth and elevation angle of a unit sighting vector from each sensor to the shock wave origin. Means are provided for calculating from those signals the azimuth and elevation angle of the unit sighting vector from each sensor to the origin of the shock wave. Means are also provided for calculating from the unit sighting vectors of each of the three sensors, the azimuth and elevation angle of the local trajectory of the projectile.

Similarly, a method for determining the trajectory of a supersonic projectile of unknown velocity and direction is provided. In this method, at least three spaced-apart sensors are provided, which sensors are capable of encountering a shock wave generated by a supersonic projectile passing in the vicinity of the sensors. The sensors are also capable of generating signals in response to the shock wave, which signals are related to an azimuth and elevation angle of a unit sighting vector from each sensor to an origin of the shock wave. An azimuth and elevation angle of a unit sighting vector from each sensor to the origin of the shock wave is calculated from the signals. From the unit sighting vectors of each of the three sensors, the azimuth and elevation angles of the local trajectory of the projectile are calculated.

BRIEF DESCRIPTION OF THE DRAWINGS

FIG. 10 and 10A are diagrammatic illustrations of disposition of the present sensors on a military vehicle, with a diagrammatic illustration of a passing projectile;

FIGS. 11 and 11A are illustrations similar to FIG. 10, but where the military vehicle is a helicopter;

DETAILED DESCRIPTION OF THE INVENTION

Before considering the details of the apparatus and method, an explanation of the believed theory by which the present invention operates is first provided, although it is expressly reserved herein that the applicants are not bound by this theory.

As is well known, when a supersonic projectile travels through the atmosphere, a series of shock disturbances occurs. When the projectile is a ballistic projectile, having a forward portion, e.g. tip or nose, these disturbances are well defined. The disturbance from the forward portion is the main shock wave, and the well-defined leading edge of that main shock wave is referred to as the main shock front.

Figure 1:
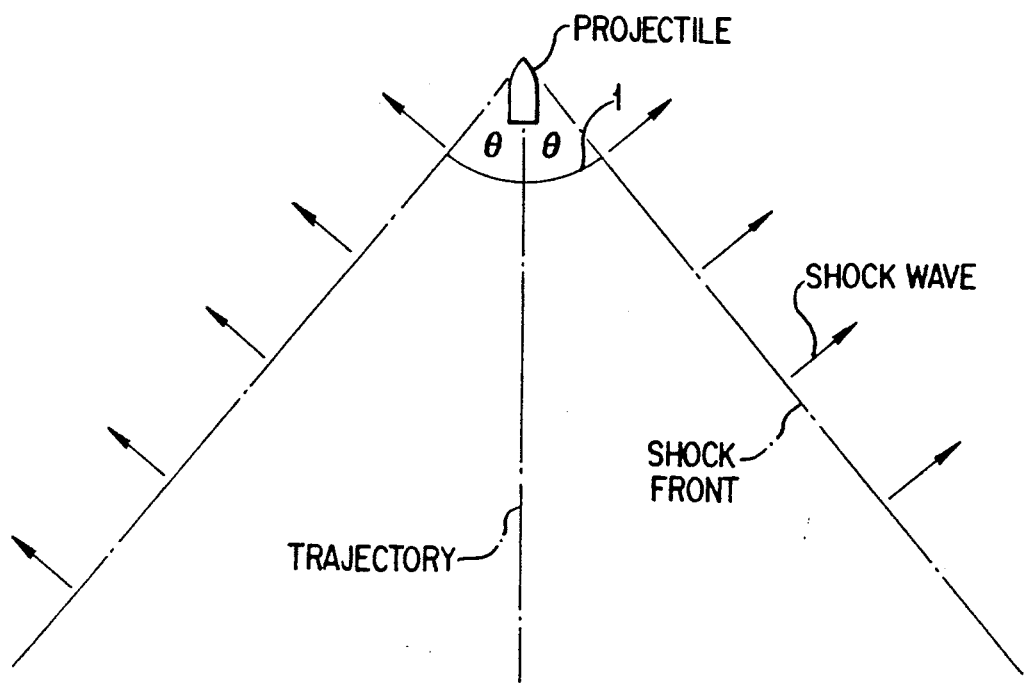
FIG. 1 is a diagrammatic illustration of the acoustical disturbances generated by a supersonic projectile.

A shock wave propagates at the speed of sound normal to that shock front, as illustrated in FIG. 1. The sine $\Theta$ of the shock angle 1 is given by the sound velocity $V_s$ divided by the projectile velocity V and is:

$$\sin(\Theta) = V_s/V. \tag{1}$$

Figure 2:
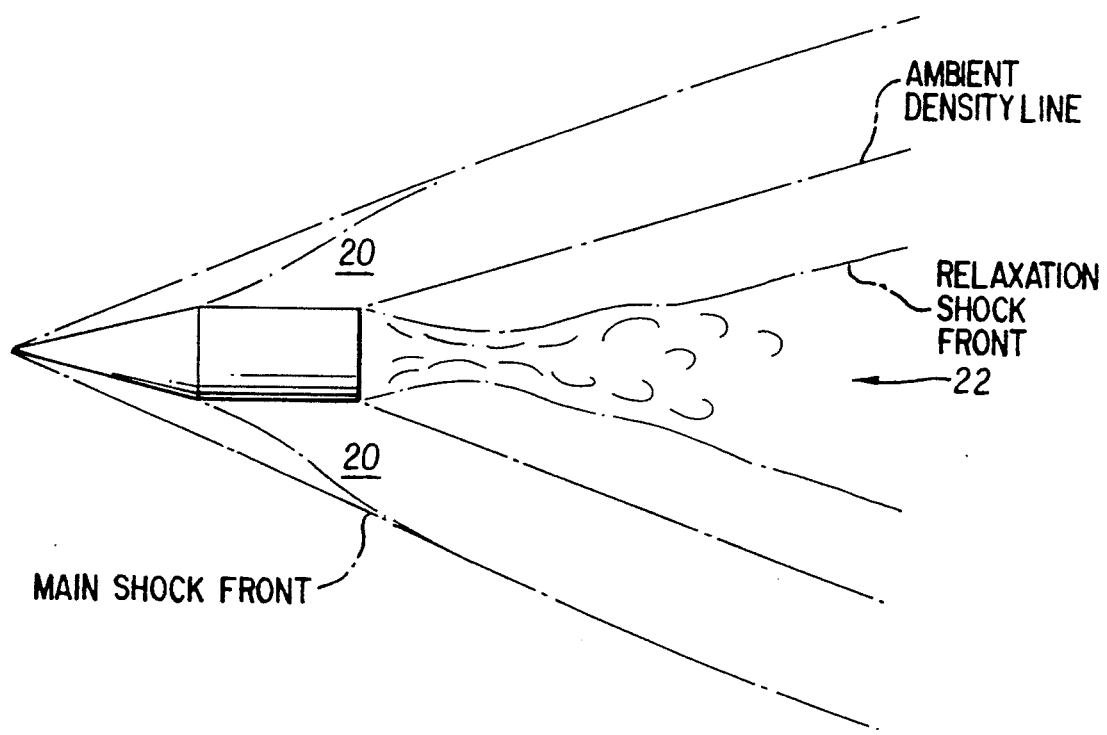
FIG. 2 is a diagrammatic illustration of major known disturbances generated by a supersonic projectile.

FIG. 2 is a representation of a Schlieren photograph of an actual projectile, the shock disturbances, and the wake thereof. As can be seen, an extremely sharp boundary exists at the main shock front formed by the main shock wave emanating from the forward portion, usually the nose, of the projectile. The onset of this boundary is typically 1 to 10 molecular mean-free-paths in length, and, hence, is quite well defined. This shock front produces a very rapid rise in pressure, for example, as measured by a sensor, which rapid rise in pressure is in the order of a sub-nanosecond.

The line emanating from the corner of the base of the projectile and mainly parallel to the main shock front may be referred to as the ambient density line, although it is really a cone. This line represents the position of a pressure isobar which is essentially the same as the ambient air pressure. Minor, less well-defined shock waves 20 originate along the projectile behind the main shock front and ahead of the ambient density line. There are also minor trailing shock waves originating behind the ambient density line and up to the relaxation shock front, at which point those waves fall back into the wake 22 of the projectile.

Figure 3:
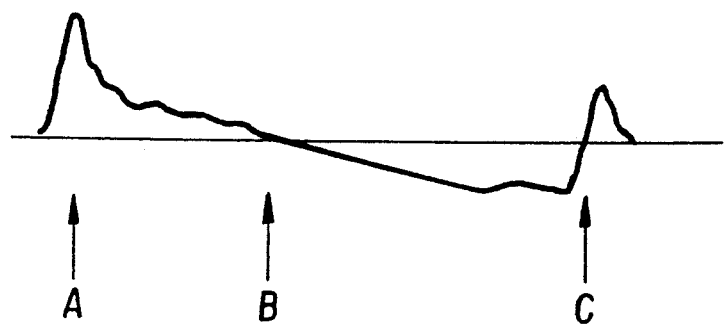
FIG. 3 is an illustration of an oscilloscope trace of signals generated from an acoustical transducer encountering a passing shock wave.

The behavior of these shock waves and their fronts can be understood from the representations of an oscillograph picture, as shown in FIG. 3. The trace is a measure of pressure on a ballistic microphone due to shock waves produced by a 5.56 mm bullet fired from an M-16 rifle. At point A, there is a sharp pressure increase which rises from ambient pressure to a high initial value, indicating the passage of the shock front of the main shock wave. As the bullet passes the microphone, the pressure drops below ambient pressure at point B, indicating the ambient density line. The pressure of the relaxation shock front and the wake are indicated at point C.

The velocity of the various shock waves is a function of the density of the gas in which these waves are travelling. Since the pressure, and hence density, is higher than ambient pressure in front of the ambient density line, the shock waves in the region between the ambient density line and the main shock front (see FIG. 2) travel faster than waves from the main shock front and eventually catch up with the main shock front. On the other hand, the shock waves originating between the ambient density line and the relaxation shock front travel through lower pressure, and hence density, and, hence, propagate more slowly than the waves from the main shock front and, therefore, fall back into the trailing wake at point C.

In view of the above, it has been discovered that the ambient density line, which emanates from the base of the projectile, is sufficiently defined that the projectile length can be estimated from the trace of FIG. 3. For example, chronographic measurements indicate that the velocity of a test bullet was approximately 3,150 ft./sec. This gives a shock cone angle of $\sin(\Theta) = 1,050/3,150$ or $\Theta = 19.5$. (see equation 1). The length $L_B$ of the bullet is approximately given by:

$$L_B = V_S t/\sin(\Theta) = Vt, \tag{2}$$

where t is the time between point A and point B along a line perpendicular to the main shock front of FIG. 3, and V is the velocity of the projectile. Since each division is 4.1 microseconds in FIG. 9, this yields a time of approximately 16.4 microseconds, and thus a length of 0.62 inch. The actual length of the 5.56 mm bullet was 0.678 inch.

It is the normal of the propagation of the shock front of the shock wave that establishes which part of the shock wave strikes an individual sensor. It is initially assumed that the portion of the conical shock wave striking an individual sensor can be considered a plane wave, and this is a reasonable assumption, if the shock wave is generated from a projectile passing some reasonable distance from a sensor. For example, for a bullet trajectory passing only one foot from a three inch sensor, this assumption leads to a less than one degree error. This error decreases rapidly as the distance from the sensor to the bullet is increased. However, if the projectile passes close to a sensor and the assumption of a plane wave introduces unacceptable error, once it is determined that the miss-distance is close to a sensor, reiteration of the calculation may be performed to correct for the shape of the shock wave.

Figure 4A:
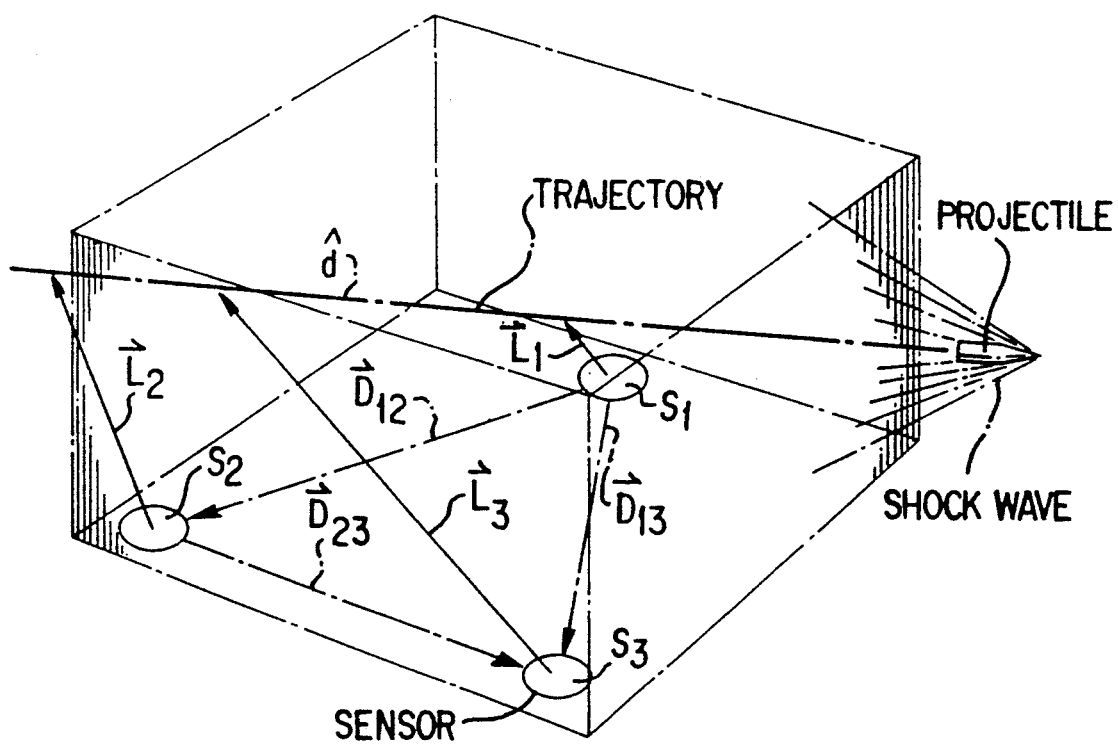
FIG. 4A is a diagrammatic illustration of the method by which the trajectory of a projectile is calculatable from the vectors generated by three spaced-apart sensors.

In FIG. 4A, sensors $S_1$, $S_2$ and $S_3$ with intraspacing vectors $\vec{D}_{12}$, $\vec{D}_{23}$ and $\vec{D}_{13}$ determine a plane. Therefore, the vector $\vec{D}_{12}$ gives the distance (magnitude) and direction of sensor $S_2$ from sensor $S_1$, and likewise vector $\vec{D}_{13}$ and $\vec{D}_{23}$ give similar distances and directions. Above this plane, at an unknown orientation with respect to the plane, is the trajectory of a projectile of unknown velocity. The sighting vector of each sensor is determined by each sensor, as explained in more detail below. Of course, a sighting vector has only direction and no magnitude (distance in this case) and may, therefore, be referred to as a unit sighting vector. Hence, these unit sighting vectors could establish a host of different three points in space and, hence, a host of possible trajectories. Thus, without more, these unit sighting vectors would be of no usefulness.

However, as briefly set forth above, it was surprisingly discovered that each unit sighting vector forms the same angle at a given velocity of a projectile with the origin of the shock wave (and, hence, the trajectory). This discovery, therefore, makes it possible to calculate the magnitude (distance) of each unit sighting vector, so that, with the magnitude determined, the unit sighting vector becomes a full sighting vector (direction and magnitude), as shown in FIG. 4A as full sighting vectors $\vec{L}_1$, $\vec{L}_2$ and $\vec{L}_3$. Without such discovery, calculation of the trajectory would have been impossible. With such full sighting vector determined, as shown in FIG. 4A, each full sighting vector will result in only one point in space, and the three points in space, one from each full sighting vector, fully establishes the actual trajectory of the projectile for almost all cases.

Figure 4B:
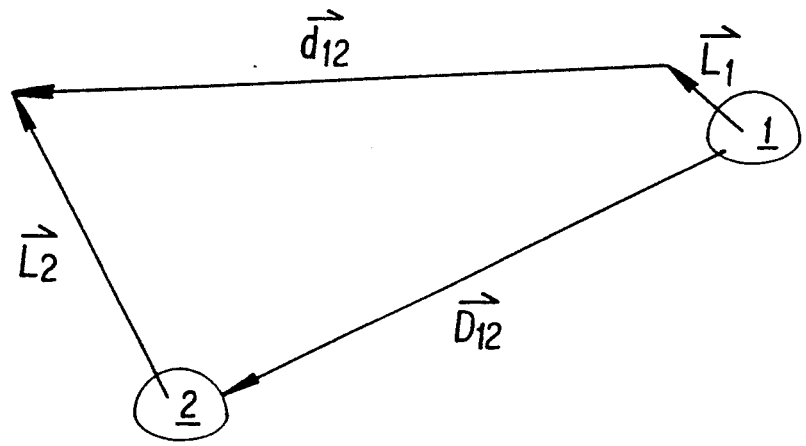
FIG. 4B is an out take of a portion of the vectors of FIG. 4A.

The vector $\hat{d}$ is defined as the local trajectory unit vector. The vector $\vec{d}_{12}$ (see FIG. 4B) designates the distance and direction from the tip of $\vec{L}_1$ to the tip of $\vec{L}_2$ along the projectile trajectory, and likewise there will be vectors $\vec{d}_{23}$ and $\vec{d}_{13}$, which are parallel to $\pm\hat{d}$, as shown in FIG. 4A. The vectors $\vec{d}_{12}$, $\vec{d}_{23}$ and $\vec{d}_{13}$ are each parallel to $\pm\hat{d}$, where $\hat{d}$ is the local trajectory.

The first key observation is that the vector dot-product of the trajectory vector $\hat{d}$ with the unit sighting vectors is just $\cos(\Phi)$ where $\Theta = \Theta + 90$ ($\Theta$ is the shock cone angle). Therefore, where the unit sighting vectors are designated $\hat{1}_1$, $\hat{1}_2$ and $\hat{1}_3$, then:

$$\hat{d}\cdot\hat{1}_1 = \hat{d}\cdot\hat{1}_2 = \hat{d}\cdot\hat{1}_3 \tag{4.3}$$

and since $$\cos(\Phi) = \sin(\Theta) \tag{4.4}$$

these dot-products are then simply equal to $V_S/V$. By noting from FIG. 4B that $$\vec{d}_{12} = \vec{L}_1 + \vec{D}_{12} + \vec{L}_2, \text{ and likewise it follows that}$$

$$\vec{d}_{13} = \vec{L}_1 + \vec{D}_{13} + \vec{L}_3, \text{ and}$$

$$\vec{d}_{23} = \vec{L}_2 + \vec{D}_{23} + \vec{L}_3 \tag{4.7}$$

Equation 4.3 can be used to form $$\vec{d}_{12}\cdot(\hat{1}_1 - \hat{1}_2) = 0 \tag{4.8}$$

$$\vec{d}_{13}\cdot(\hat{1}_1 - \hat{1}_3) = 0 \tag{4.9}$$

$$\vec{d}_{23}\cdot(\hat{1}_2 - \hat{1}_3) = 0 \tag{4.10}$$

Substituting Equations 4.5 through 4.7 into Equations 4.8 through 4.10 and carrying out the dot-product distribution, it is found that:

$$-|\vec{L}_1| + \vec{D}_{12}\cdot\hat{1}_1 + |\vec{L}_2|\hat{1}_1\cdot\hat{1}_2 + |\vec{L}_1|\hat{1}_1\cdot\hat{1}_2 - \vec{D}_{12}\cdot\hat{1}_2 - |\vec{L}_2| = 0 \tag{4.11}$$

$$-|\vec{L}_1| + \vec{D}_{13}\cdot\hat{1}_1 + |\vec{L}_3|\hat{1}_1\cdot\hat{1}_3 + |\vec{L}_1|\hat{1}_1\cdot\hat{1}_3 - \vec{D}_{13}\cdot\hat{1}_3 - |\vec{L}_3| = 0 \tag{4.12}$$

$$-|\vec{L}_2| + \vec{D}_{23}\cdot\hat{1}_2 + |\vec{L}_3|\hat{1}_2\cdot\hat{1}_3 + |\vec{L}_2|\hat{1}_2\cdot\hat{1}_3 - \vec{D}_{23}\cdot\hat{1}_3 - |\vec{L}_3| = 0 \tag{4.13}$$

or, rearranging, $$-(|\vec{L}_1| + |\vec{L}_2|) + (|\vec{L}_1| + |\vec{L}_2|)\hat{1}_1\cdot\hat{1}_2 + \vec{D}_{12}\cdot(\hat{1}_1 - \hat{1}_2) = 0 \tag{4.14}$$

$$-(|\vec{L}_1| + |\vec{L}_3|) + (|\vec{L}_1| + |\vec{L}_3|)\hat{1}_1\cdot\hat{1}_3 + \vec{D}_{13}\cdot(\hat{1}_1 - \hat{1}_3) = 0 \tag{4.15}$$

$$-(|\vec{L}_2| + |\vec{L}_3|) + (|\vec{L}_2| + |\vec{L}_3|)\hat{1}_2\cdot\hat{1}_3 + \vec{D}_{23}\cdot(\hat{1}_2 - \hat{1}_3) = 0 \tag{4.16}$$

Through further straightforward manipulations, the following set of equations are derived:

$$|\vec{L}_1| + |\vec{L}_2| = \vec{D}_{12}\cdot(\hat{1}_1 - \hat{1}_2)/(1 - \hat{1}_1\cdot\hat{1}_2) = K_{12} \tag{4.17}$$

$$|\vec{L}_1| + |\vec{L}_3| = \vec{D}_{13}\cdot(\hat{1}_1 - \hat{1}_3)/(1 - \hat{1}_1\cdot\hat{1}_3) = K_{13} \tag{4.18}$$

$$|\vec{L}_2| + |\vec{L}_3| = \vec{D}_{23}\cdot(\hat{1}_2 - \hat{1}_3)/(1 - \hat{1}_2\cdot\hat{1}_3) = K_{23} \tag{4.19}$$

where K is a constant.

The center terms in Equations 4.17 through 4.19 involve quantities which are calculated from the azimuthal and elevational angles of the unit sighting vectors from each sensor to the trajectory, and from the known locations of the sensors. Thus, once the sensors make a "sighting", the K-constants $K_{12}$, $K_{13}$, and $K_{23}$ are fixed. It is then a simple step to solve for the magnitudes of $\vec{L}_1$, $\vec{L}_2$, and $\vec{L}_3$ in terms of the K-constants.

$$|\vec{L}_1| = (K_{12} + K_{13} - K_{23})/2 \tag{4.20}$$

$$|\vec{L}_2| = (K_{12} + K_{23} - K_{13})/2 \tag{4.21}$$

$$|\vec{L}_3| = (K_{13} + K_{23} - K_{12})/2 \tag{4.22}$$

These equations, therefore, succeeded in determining the magnitude and direction of the unit sighting vectors and result in the full sighting vectors $\vec{L}_1$, $\vec{L}_2$ and $\vec{L}_3$. The unit sighting vectors $\hat{1}_1$, $\hat{1}_2$ and $\hat{1}_3$ are determined from the azimuthal and elevational angles calculated from the signals of each sensor.

It will be appreciated that only two of these $\bar{L}$-vectors are needed to located the local trajectory in most cases, but three will provide the trajectory in almost all cases. Further, it will be noted that this trajectory is collinear with the unit vector $\hat{d}$. This implies that the dot-products of Equation 4.3 can be constructed and thus the quantity $V_S/V$ can be derived. If an assumption of the sound speed can be made or measured, then the velocity of the projectile can be calculated.

As has been demonstrated above, given at least three sensors, each of which is capable of generating a signal related to the azimuth and elevation angle of the unit sighting vector and, hence, capable of determining the azimuthal and elevational angles to the normal of an incoming shock wave, a solution of the trajectory and projectile velocity can be found.

In an example of a practical application of the above, and as a preferred embodiment, the required signals can be generated by positioning three pressure sensitive transducers (three such transducers constitute a single sensor) at the apexes of a triangle, i.e. an equilateral triangle. These signals allow measurements which include the difference in time ($t_F$) that the shock front encounters the first of the transducers (referred to as a hit) and the time of the hit of the second of the transducers, the time difference ($t_L$) between the first hit transducer and the last hit transducer, identification of the first hit transducer, and identification of the second hit transducer.

Figure 5:
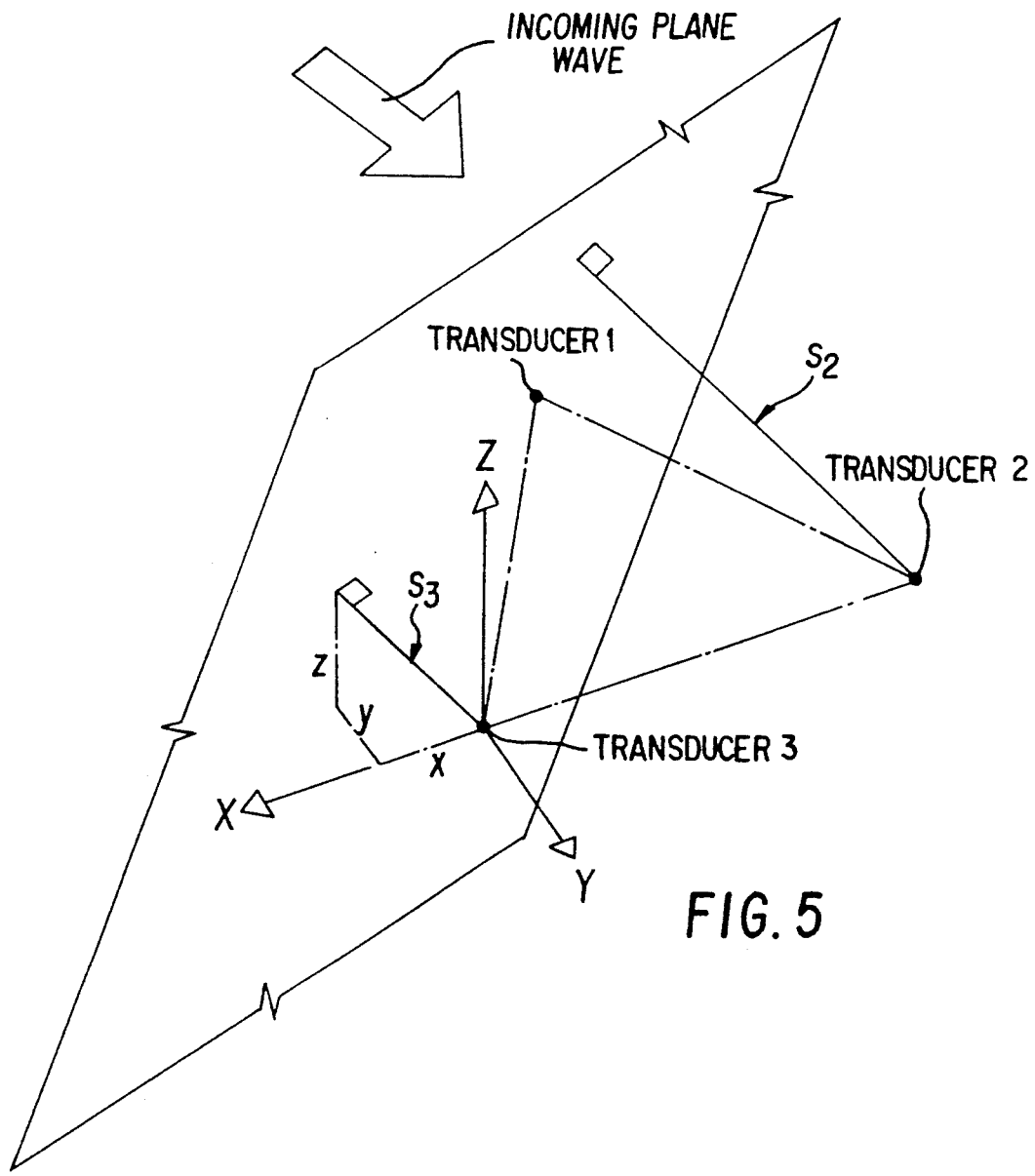
FIG. 5 is a diagrammatic illustration of the method of calculating the vectors to the trajectory of a passing supersonic projectile.

The origin is placed at transducer 3 as indicated in FIG. 5. The plane shock wave is assumed to hit transducer 1 first, transducer 2 second, and transducer 3 last. A change in this order will require a rotation of coordinates in order to have the azimuthal and elevational angles point into the correct quadrant. If the geometry is "frozen" just as the plane wave strikes transducer 1, the time $t_F$ implies that the plane wave stands a distance $S_2 \equiv t_F V_s$ from transducer 2 and a distance $S_3 \equiv t_L V_s$ from transducer 3. This can be accomplished by determining the x, y, and z coordinates at the intersection of line $S_3$ with the incoming plane wave, as illustrated in FIG. 5.

Since the transducers are arranged in an equilateral triangle, a derivation of this embodiment provides the following results:

$$x = S_3(S_2 - S_3)/S \quad (4.31)$$

$$y = -(S_2 S_3 + S_3^2)/(S(3)^{\frac{1}{2}}) \quad (4.32)$$

$$z = [(S_3^2(S^2 - (S_3 - S_2)^2)/S^2 - y^2]^{\frac{1}{2}} \quad (4.33)$$

where S is the distance between each of the transducers. Of course, when other than an equilateral triangle arrangement is used, S will not be the same for x, y and z.

The azimuthal angle $\phi$ and the elevational angle $\phi$ of the normal vector to the incoming plane wave are then given by:

$$\phi = \tan^{-1}(y/x) \quad (4.34)$$

$$\psi = \tan^{-1}(z/(x^2 + y^2)^{\frac{1}{2}}). \quad (4.35)$$

Projectile identification, e.g. at least the approximate caliber, is also obtainable from the above. As described above, the initial solutions of the equations give the local trajectory and the velocity of the projectile, i.e. with the vectors described in connection with FIG. 4A and FIG. 4B. Also, as discussed above, a determination of the projectile length may be obtained, e.g. the 5.56 mm bullet, discussed above. The magnitude of the onset of the shock wave, when normalized to the miss-distance, is related to mass. These three pieces of information, i.e. the normalized magnitude, the velocity and the projectile length, are sufficient to yield an identification of the projectile, at least within a limited class of possibilities.

In this regard, the dimensions, flight dynamics and wave generation of most military projectiles, manufactured throughout the world, are known or can be ascertained. When the projectile length is determined, this places the projectile in a defined class. The magnitude of the onset of the main shock wave, which is related to the main shock front magnitude, defines the mass of the projectile and places the projectile in a subclass of that class. The velocity then classifies the projectile as to a specific projectile or at least a subclass of projectiles. For example, the determined length of the projectile can distinguish between small arms rounds and larger caliber rounds and, for example, place the larger caliber round within a defined group or class of such rounds having that approximate length. The magnitude of the onset of the shock wave relates to the mass of the projectile and, with the length of the projectile, determines the approximate caliber. The length and caliber defines a more limited group or subclass of projectiles. The velocity further defines a more limited group of projectiles and may be sufficient, with the length and caliber, to identify a specific projectile.

Such identification is not only useful for determining the entire trajectory, as explained below, but is most useful for distinguishing enemy and friendly fire, so as to avoid battlefield accidents where friendly fire is directed toward friendly military units.

After the projectile identification has been made, the coefficient of drag and the exact mass of the projectile can be ascertained from known data and ascertained data. These two pieces of information provide enough data to back-calculate the trajectory of the projectile to its point of origin (taking into account the projectile miss-distance). This can be accomplished through standard fire control algorithms. Other environmental information such as temperature or windage can be used to refine that calculation, if desired. Finally, even if a positive identification of the specific projectile is not obtainable, the class identification can yield a generic drag coefficient which will result in only small errors in the point-of-origin calculation.

Figure 6:
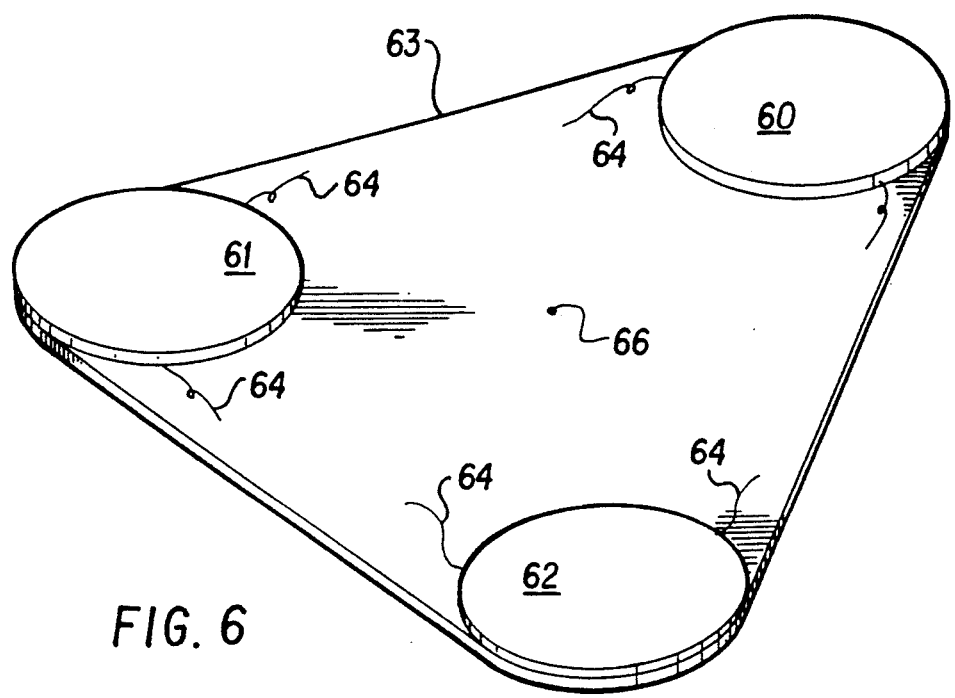
FIG. 6 is an illustration of a suitable sensor arrangement.

A typical specific embodiment of the preferred sensor is shown in FIG. 6, but the sensor can be of any desired configuration consistent with the requirements, as described above and as explained more fully below. In the example shown in FIG. 6, each transducer 60, 61, 62 (three being shown in FIG. 6) is mounted on a support 63 (discussed more fully hereinafter). The transducers may be any acoustical transducer capable of generating a signal in response to pressure on the transducer created by the shock wave encountering the transducer. The transducers may generate a light signal, an acoustical tone signal, an electrical signal, or others, but commercially available piezoelectric crystals are quite convenient in this regard. For example, the transducers shown in FIG. 6 are such piezoelectric crystals made by Electro-Ceramics, and are 0.125 inch thick and 1 inch in diameter, although any desired configurations thereof may be used. A wire 64 is soldered to each side of the crystals after the surface of the crystal is prepared with an abrasive material, such as Scotch Brite. The polarity of each crystal is noted so that each input to the crystal has the same polarity going to the detection electronics, explained below. A positive voltage output is produced during compression of the crystal by the shock wave. The crystals may be glued to the support 63 with an adhesive, such as a silicone-based adhesive, and, preferably, the support is a conventional shock-absorbent material, e.g. Isodamp. This material has an acoustical damping property, which is useful, as explained more fully below. Each of the transducer crystals is positioned on support 63 in a known geometry, for the reasons explained in connection with FIG. 4A and FIG. 4B, e.g. an equilateral triangle with leg lengths of 3 inches, although any known geometry and any length of distances between the crystals may be used. The equilateral triangle, however, simplifies the calculations, discussed above, and for that reason is the preferred embodiment.

Figure 7:
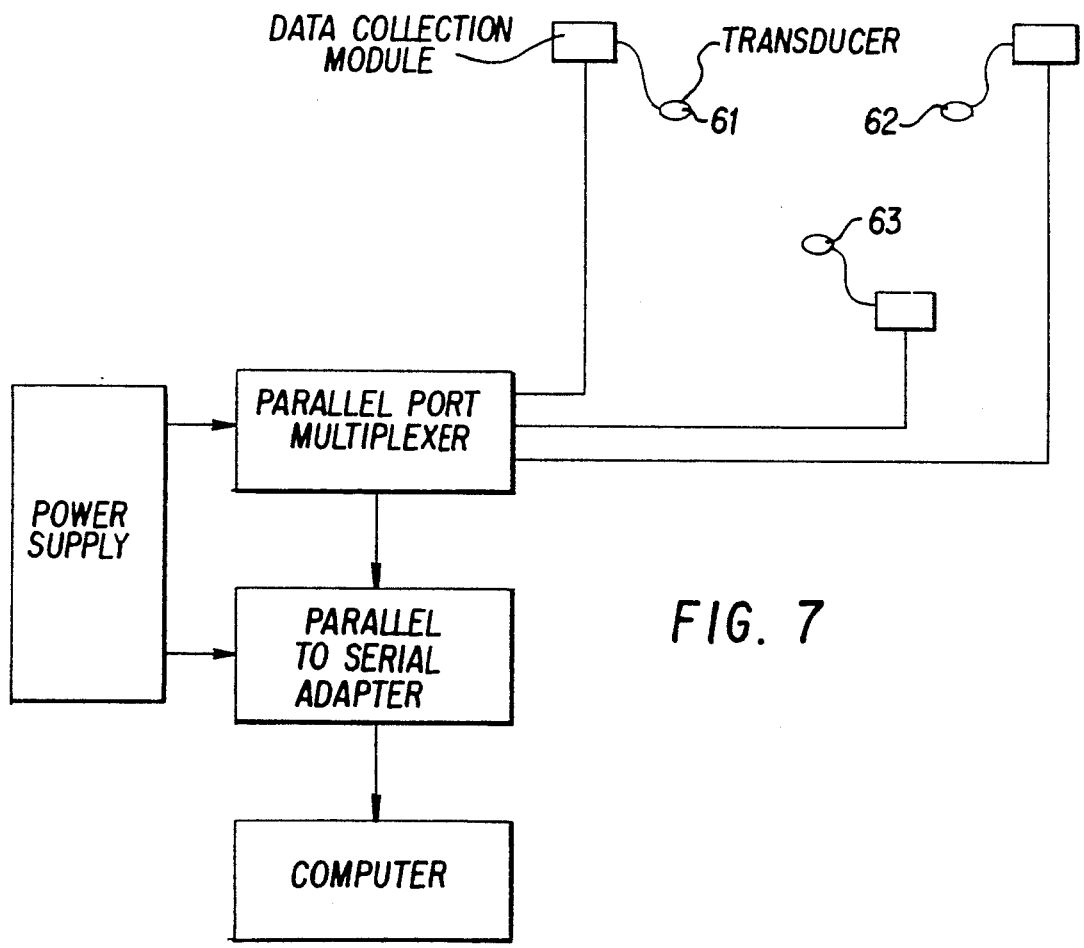
FIG. 7 is an illustration of a suitable apparatus arrangement.

The six wires 64, two from each of the three transducers 60, 61 and 62, are inputted to a data collection module as shown in FIG. 7, with one data collection module for each transducer. These modules determine which transducer has the first hit by a main shock wave, more preferably by the main shock front, which transducer has a second hit by that shock wave, and the time between the first hit and the second hit, as well as the time between the first hit and the last hit. This information is fed to a computer for making the required calculations, as explained above, by any conventional devices, such as a parallel port multiplexer to a parallel-to-serial adapter, with associated required power supplies, also as shown in FIG. 7. For example, this arrangement can accommodate twelve 8-bit parallel input ports and switch each, in turn, to a single 8-bit output parallel port. The output is fed through a parallel-to-serial adapter to the computer. All of the components of this arrangement, with the exception of the sensors, are commercially available and well known to the art. Hence, no further description thereof is necessary.

Once in the computer, the data is used in the above-described calculations to convert that data to azimuthal and elevational information for each transducer of a sensor. In addition, as described above, there will be at least three sensors, and a similar arrangement as described above is used for each sensor. The computer takes the data from each sensor and makes the mathematical calculation, described above, for the azimuth and elevation of the full sighting vector generated from each sensor. For example, in the arrangement shown in FIG. 6, the origin of the vector will be central point 66 of the three transducers, with the full sighting vector of the transducers extending to the projectile trajectory, as shown in FIG. 4. That calculation, therefore, obtains the position, the azimuth and the elevation of the local trajectory of the projectile, in the vicinity of the sensors, as well as the velocity of the projectile.

While the above describes a useful embodiment of the invention, other means of measuring the time when the shock wave encounters each of the transducers of the at least three sensors may be used, and it is only necessary that some means be provided for measuring the time when the shock wave encounters each of the transducers of the sensors, since, quite obviously, it is not the particular means but the measurement of time by those means which is important to the invention.

Likewise, any means for calculating from the measured time, the azimuth and elevation angle of the trajectory of the projectile may be used. While the arrangement shown in FIG. 7 is quite satisfactory, and a preferred embodiment, other arrangements for making that calculation may be used.

Similarly, while a computer will be used for calculating the azimuth and elevation angle of the projectile trajectory, such calculations may be made by ordinary mathematical solving, although, for most uses, that would be too slow, especially for battlefield conditions. Accordingly, normally, a computer will be used for such calculations.

It will also be appreciated, especially in battlefield conditions, that a great number of acoustical waves may be present. It is, therefore, important that the apparatus be capable of discriminating between background battle noise, causing other acoustical waves, and the shock waves created by a passing projectile of interest. Thus, the sensors must be sensitive to a shock wave propagated by a passing projectile, and since some information, as described above, is obtained from the ambient density line, the sensors should be sensitive to the ambient density line, so as to provide means for calculating the length of the projectile. On the other hand, the sensors and/or associated apparatus must distinguish between the shock waves of a passing projectile and background battle noise.

Conventional means are available for producing such sensitivity. For example, either the transducers or the data collecting module or the computer may be such that signals generated by the transducers will only be accepted by the computer when those signals have a rise time consistent with a shock front of a passing projectile, e.g. in the sub-nanosecond range, as opposed to the much longer rise times of background battle noise. Alternatively, a separate sensor, sensitive to the shock front of a passing projectile and insensitive to diffused battle background noise, may be used as a gate for delivering or interrupting transfer of signals from the sensors to the computer.

As will be appreciated from the above and as directly opposed to prior art discussed in the BACKGROUND OF THE INVENTION, herein, "cross-talk" between transducers of a sensor or between sensors should be as little as possible. Thus, as opposed to that prior art, the present transducers/sensors should be substantially acoustically isolated from each other. As shown in and discussed in connection with FIG. 6, the support for the transducers is an acoustical damping material, such as conventional Isodamp. When the support is, for example, mounted on a tank, the acoustical damping material will isolate the set of three transducers from each other and from the tank itself. Otherwise, "cross-talk" between transducers or sensors could not only provide acoustical shock energy from other than an incoming shock wave, but could so diffuse the pressure rise at a transducer so as to make discrimination between the shock wave and background battle noise impossible.

Figure 8:
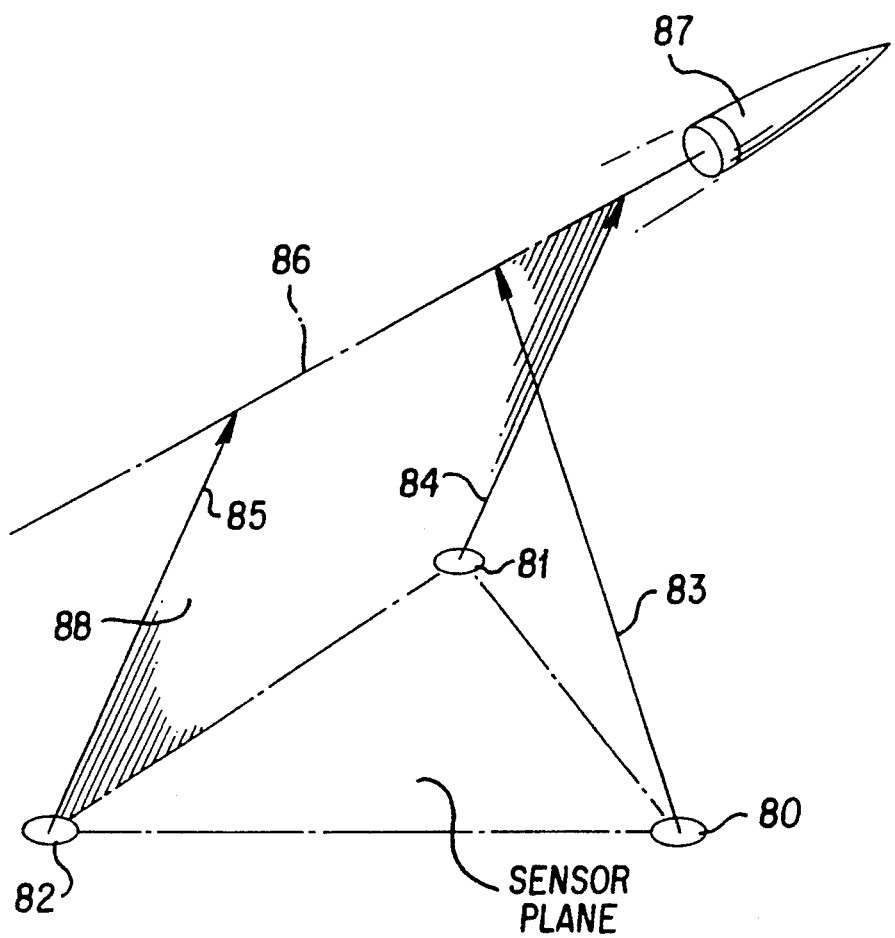
FIG. 8 is a diagrammatic illustration of a special case for calculation when the trajectory of a projectile is parallel to two of the present three sensors.

As illustrated in FIG. 8, at least three sensors 80, 81 and 82, e.g. arranged in a common sensor plane, are necessary for generating at least three full sighting vectors 83, 84 and 85 to the trajectory 86 of the projectile 87, which projectile 87 creates the shock wave 88. However, as shown in FIG. 8, while the chances are small, it is possible for the projectile to pass two sensors on a trajectory which is parallel to the line of two sensors. In such a case, the above solution of the trajectory will not be possible. As an illustration in the above mathematical analysis, let $\hat{i}_2 \cdot \hat{i}_3 = 1$. This implies that only $\hat{l}_2$ and $\hat{l}_3$ are parallel and equal, i.e. sensors 81 and 82 lie in the same plane as the trajectory but sensor 80 is not in that plane. Equation 4.19, above, then becomes useless, leaving two equations in two unknowns. However, by using information about the difference in the initial time of arrival ($\Delta t_{12}$) at sensors 81 and 82, the following relationship can be constructed:

$$\Delta t_{12} = |\vec{L}_2|/V_S + |\vec{d}_{12}|/V - |\vec{L}_1|/V_S. \quad (4.23)$$

or recalling that $\hat{d} \cdot \hat{l}_1 = V_S/V$ and rearranging, $$|\vec{d}_{12}|V_S/V = V_S \Delta t_{12} + |\vec{L}_1| - |\vec{L}_2| = \vec{d}_{12} \cdot \hat{l}_1. \quad (4.24)$$

The convention that if the signal arrives at sensor 81 before sensor 82 then $\Delta t_{13}$ is positive has been adopted. Dotting the unit vector $\hat{l}_1$ into Equation 4.5:

$$\vec{d}_{12} \cdot \hat{l}_1 = -\vec{L}_1 \cdot \hat{l}_1 + \vec{D}_{12} \cdot \hat{l}_1 + \vec{L}_2 \cdot \hat{l}_1. \quad (4.25)$$

Equations 4.25 and 4.26 and carrying out the dot products:

$$-|\vec{L}_1| + \vec{D}_{12} \cdot \hat{l}_1 + \vec{L}_2(\hat{l}_1 \cdot \hat{l}_2) = V_S \Delta t_{12} + |\vec{L}_1| - |\vec{L}_2|, \quad (4.26)$$

or rearranging terms, $$2|\vec{L}_1| = \vec{D}_{12} \cdot \hat{l}_1 + \vec{L}_2(1 + \hat{l}_1 \cdot \hat{l}_2) - V_S \Delta t_{12}. \quad (4.27)$$

Using $|\vec{L}_1| = -|\vec{L}_2| + K_{12}$ from Equation 4.17, substituting into Equation 4.27, and solving for $|\vec{L}_2|$, $$|\vec{L}_2| = [2K_{12} - \vec{D}_{12} \cdot \hat{l}_1(1 - \hat{l}_1 \cdot \hat{l}_2) - V_S \Delta t_{12}]/(3 - \hat{l}_1 \cdot \hat{l}_2). \quad (4.28)$$

Again using Equation 4.17 and Equation 4.18, $$|\vec{L}_1| = K_{12} - |\vec{L}_2| \quad (4.29)$$

$$|\vec{L}_3| = K_{13} - |\vec{L}_1|. \quad (4.30)$$

As previously, the magnitudes of the full sighting vectors are now calculated from Equations 4.28 through 4.30, and the unit directions of these vectors are the sensor outputs. This resolvable degenerate case provides the significant implication that three sensors can provide the solutions for trajectory and velocity in all cases, except when the projectile is in the plane of all three of the sensors and outside the region bounded by the three sensors (an extremely unlikely occurrence). It further implies that a system of four sensors, arranged non-coplanarally, can provide a solution in all cases, by using three sensors, at least one of which does not lie in the plane of the trajectory.

As can also be appreciated, the disposing of three sensors in a plane may not be practical for all military applications, and, in addition, the military application might be such that the shock wave of a projectile passing close to a piece of military equipment might be somewhat masked from one or more of the sensors by apparatus on the military equipment, such as the turret of a tank and the like. Therefore, in such applications, a plurality of more than three sensors are provided, and means are provided for selecting at least three of the plurality of sensors for calculating the azimuth and elevation angle of the trajectory. For example, where a plurality of the sensors are used, and while the data is collected in each data collection module (see FIG. 7) for each of the transducers and/or sensors, the computer may make the calculation from only three selected sensors. That selection will be made by the computer in regard to the clarity or rise time of the signal generated by the transducers and/or sensors, or other like discriminating means.

Figure 9:
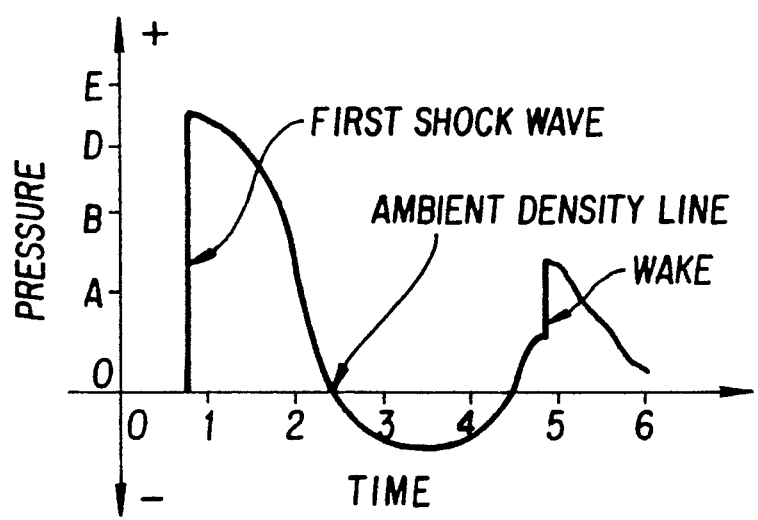
FIG. 9 is an idealized illustration of signals produced by the present sensors during the encountering and passing of a shock wave.

As illustrated in FIG. 9, which is an idealized illustration, the discriminating means may reject any signal that does not have a first shock wave that rises to a peak in less than a sub-nanosecond, as illustrated at time unit 1 (an arbitrary unit shown only for illustration purposes). Or since all military projectiles will have a length within some defined lengths, a signal which does not have a pressure rise from and pressure fall to the ambient density line within a prescribed time (arbitrary units 1 to 2.5 in FIG. 9) would be rejected. Or since any projectile will have a wake, any signal that does not fall below the ambient density line and then rise above the ambient density line would be rejected. Other criterion could be adopted.

Thus, the computer will canvas all sensors and reject signals for calculation purposes which do not meet such established criterion. From those sensors which meet the criterion, a second or third or further set of criterion, along the above lines, can narrow the accepted signals for calculation purposes to only three or four or so sensors, e.g. such further narrowing until only three sensor signals are accepted for calculation purposes.

From the above, it will also be appreciated that the signal transmitted from the sensors can be any signal which is proportional to the pressure increase of the shock wave, e.g. a tone signal, a light signal, an electrical signal, etc. Similarly, the sensor is one which produces such proportional signal. However, electrical signals are more convenient to use and are preferred.

As noted above, a preferred embodiment of the sensors is where each sensor has three spaced-apart, preferably co-planar, transducers. However, the sensor, as can be appreciated from the above, can take any desired form, so long as the sensor will generate the required unit sighting vector or signals from which the unit sighting vector can be calculated. For example, a number of the transducers may be mounted on the surface of a hemisphere with the center of the hemisphere being the origin of the unit sighting vector. By detecting which transducer is first hit by a shock wave, the position of that first hit transducer to the origin provides the unit sighting vector. Alternatively, crystals which internally generate a unit sighting vector may be used or other like sensors.

Depending upon the military application, the sensors may be closely spaced or may be spaced apart some distance. For example, with portable units, such as might be deployed on a rifle, the sensors must be spaced apart at least 1 cm, but, generally, it is preferred that the sensors be spaced apart at least 3 cm, and for most applications, it is preferable that the sensors be spaced apart at least 100 cm, or, alternately, the selected sensors, where a plurality of more than three sensors are used, are spaced apart at least 100 cm. For a central battlefield detection unit, the sensors may be spaced apart at least 200 cm and even up to as far as 30 meters apart.

As examples of the foregoing, FIG. 10 shows an application of the invention where the sensors are mounted on a tank and a plurality of such sensors are disposed around that tank. With such disposition of a plurality of such sensors, it can be seen that at least three sensors will be in a position for accurately determining the time and time lapses of the shock wave, no matter at what angle or orientation the projectile passes the tank.

Of the plurality of sensors, depending upon criterion selected, as discussed above, three, or more, of the sensors are selected for calculating the azimuth and elevation of the trajectory of the passing projectile. By making the above-described calculations, a tank commander can return suppressing fire. In addition, those calculations will allow the tank commander to direct detection equipment, e.g. IR detectors (which have a narrow field of view), toward the incoming fire and detect the position of, for example, an enemy tank.

FIG. 11 illustrates a different piece of military equipment where three sensors are mounted on the rear strut of a helicopter. That rear strut is in a position to, essentially, accurately determine the trajectory of a projectile, no matter at what angle or orientation the projectile passes the sensors.

Figure 12:
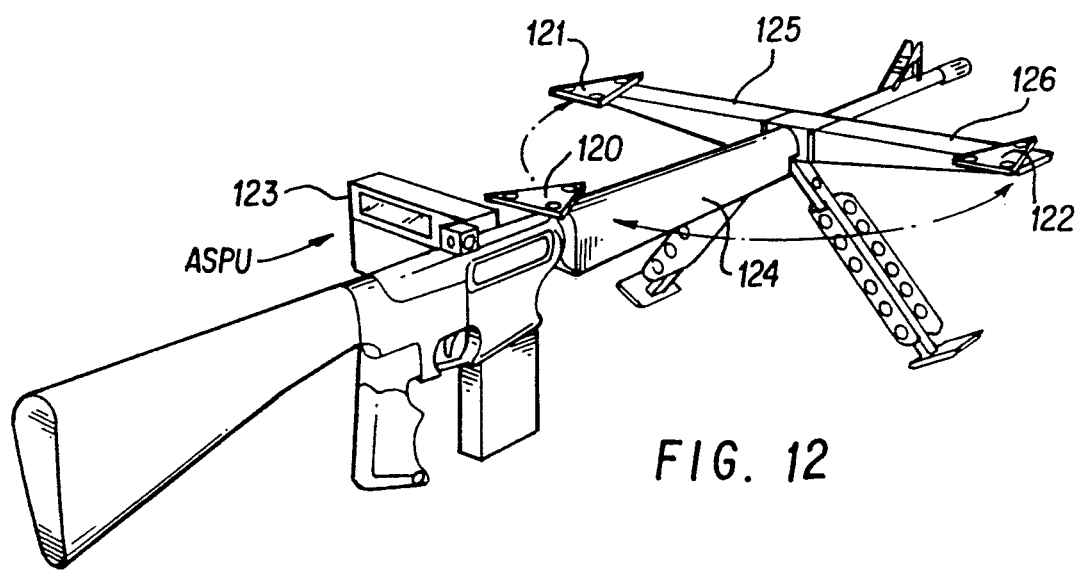
FIG. 12 illustrates the use of the present sensors in connection with a small arm, i.e. a rifle.

FIG. 12 shows three Sensors 120, 121 and 122 mounted on a rifle, along with the appropriate data processing unit 123, referred to as an acoustical signal processing unit (ASPU). One of the sensors is mounted on the barrel 124 of the rifle, while two of the sensors are mounted on retractable sensor arms 125 and 126. This provides sensors for determining the direction of projectiles, such as small arms fire, which may be incoming from an unknown direction.

Figure 13:
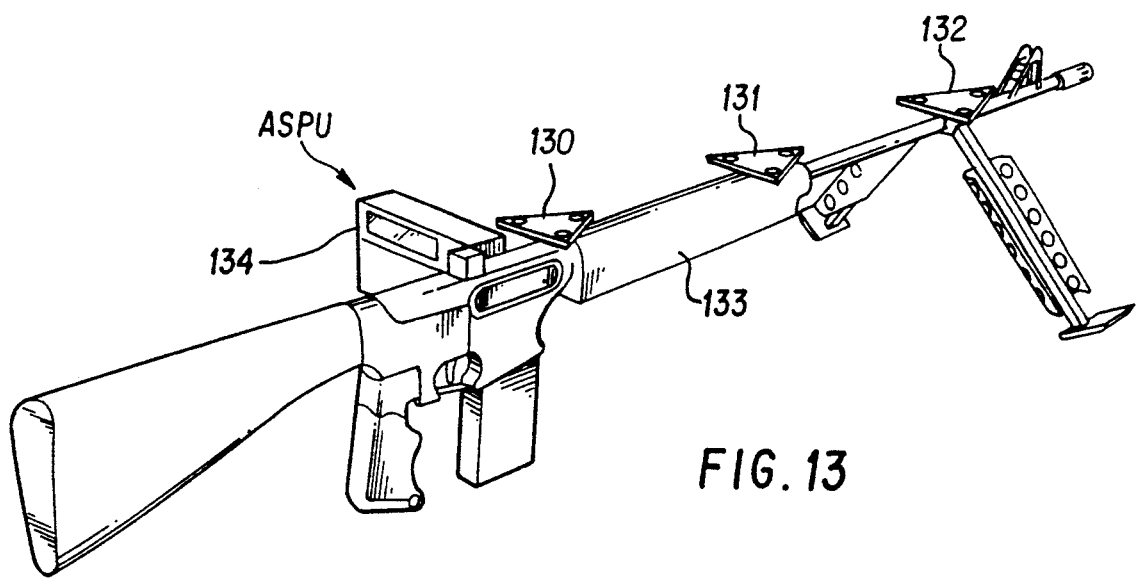
FIG. 13 shows an alternate disposition of the present sensors on a rifle.

FIG. 13 shows an acceptable, but less desirable, embodiment, as opposed to FIG. 12, where all three sensors 130, 131 and 132 are mounted on barrel 133 of the rifle. Obviously, if a projectile comes along the line of the sensors, or very close to that line of the sensors, then the present calculations by the data processing unit 134 (ASPU) will not be possible.

Figure 14:
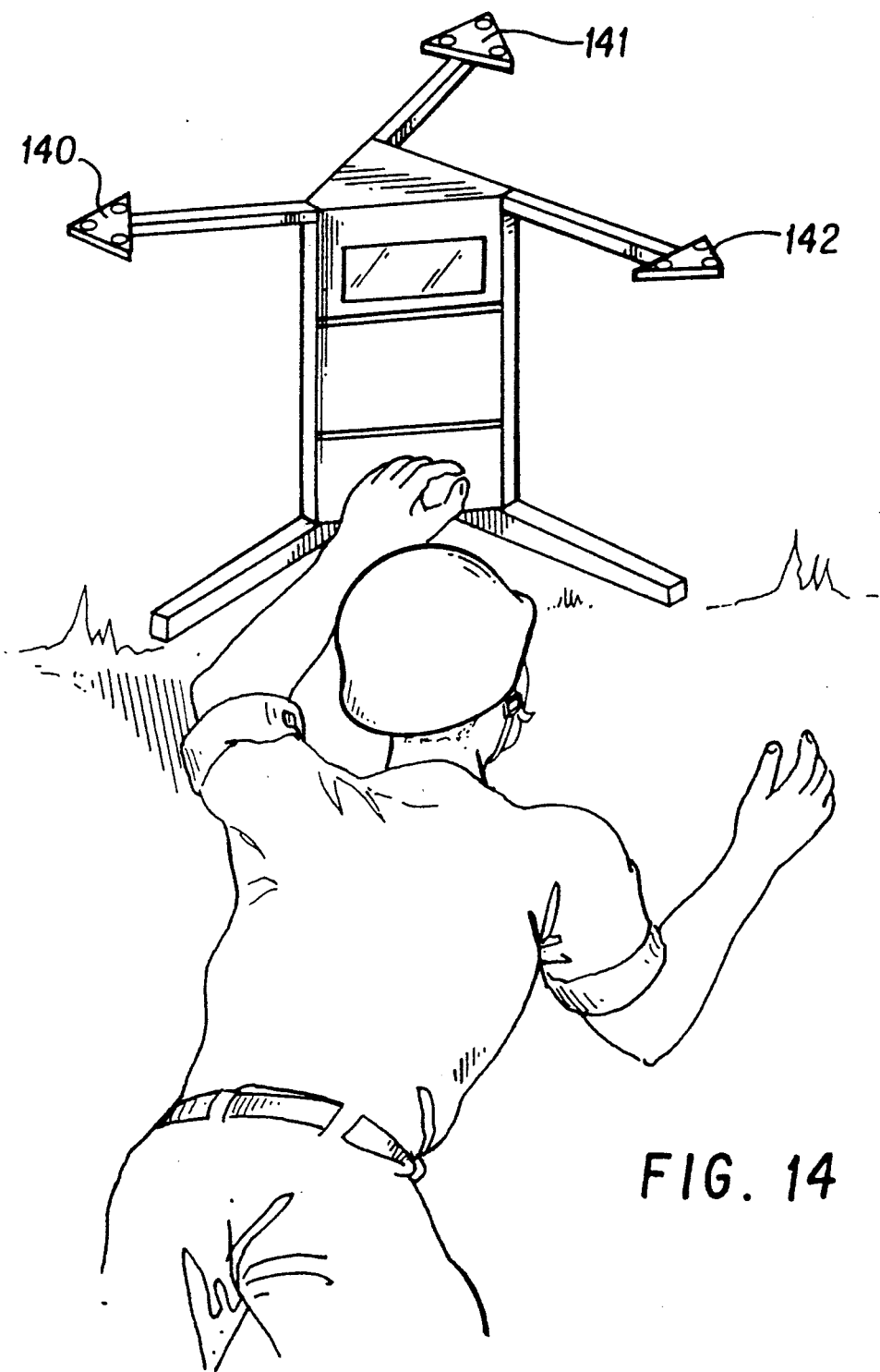
FIG. 14 shows the present sensors disposed on a portable device.

FIG. 14 shows another application where a portable unit is provided having sensors 140, 141 and 142 such that, for example, a squad leader may determine the direction of incoming fire.

The architecture of installation of the sensors will depend upon the particular military equipment upon which the sensors are placed, bearing in mind practical applications of placing such sensors. When the sensors are mounted on a motorized vehicle, such as the tank shown in FIG. 10, the sensors should be mounted on the vehicle surface and physically isolated from vehicle-induced noise, using standard high hysteresis shock insulation techniques and materials. A wiring harness (not shown) will penetrate the tank vehicle, at some less vulnerable position of the tank, and transmit the signals produced by the sensors to an Acoustic Signal Processing Unit (ASPU) (not shown in FIG. 10). The ASPU contains the necessary conventional timing circuits, discrimination circuits and computational algorithms to establish the projectile velocity, miss-distance and location of origin of the projectile, as explained above. That ASPU will also contain the ballistic data base of common friendly and hostile projectiles for comparing the information obtained by the present invention with those projectiles, as explained above.

The ASPU shown in FIGS. 12 and 13 may be the same or abbreviated versions of an ASPU mounted on a tank. For example, the ASPU of FIGS. 12 and 13 may simply be that of showing the azimuth and elevation of the projectile trajectory, and possibly an indication of only whether the projectile is a shell or small arms fire.

Thus, the present invention provides a very accurate and easily achieved means and method of determining the trajectory of a projectile. The apparatus consists of components which are commercially available and can be assembled into a wide variety of configurations for a wide range of applications, as explained above. The apparatus is relatively inexpensive to build and easy to operate, which is necessary for battlefield conditions. Accordingly, the invention provides a considerable advance in the art.

Having thus described the invention, it will be apparent that the invention admits to many variations beyond the specific, exemplary description above, all of which are intended to be embraced by the spirit and scope of the following claims.

What is claimed:

1. Apparatus for determining the trajectory of a supersonic projectile of unknown velocity and direction, comprising:
   (1) at least three spaced-apart sensors capable of encountering a shock wave generated by a supersonic projectile passing in the vicinity of the sensors and capable of generating signals in response to the shock wave, which signals are related to an azimuth and elevation angle of a unit sighting vector from each sensor to an origin of the shock wave;
   (2) means for calculating from the said signals the azimuth and elevation angle of the unit sighting vector from each sensor to the origin of the shock wave; and
   (3) means for calculating from the unit sighting vector of each of the three sensors, the azimuth and elevation angle of the local trajectory of the projectile.

2. The apparatus of claim 1 wherein the sensors have transducers which are sensitive to a shock wave propagated by a projectile.

3. The apparatus of claim 2 including means for measuring the time lapses of the shock wave in passing the transducers of a sensor.

4. The apparatus of claim 3 including means for measuring differences in time lapses of the shock wave in passing the transducers.

5. The apparatus of claim 4 wherein the transducers are sensitive to the shock front of the shock wave.

6. The apparatus of claim 1 wherein the sensors are sensitive to the shock wave and to an ambient density line and means are provided for calculation of the length of the projectile from the time lapse of the passing of the shock wave and the ambient density line over a sensor.

7. The apparatus of claim 2 wherein there are three transducers in each sensor.

8. The apparatus of claim 7 wherein the transducers are arranged as an equilateral triangle.

9. The apparatus of claim 1 wherein the at least three sensors are arranged so as to form a triangle.

10. The apparatus of claim 1 wherein there is a plurality of more than three sensors and means are provided for selecting at least three sensors from the plurality of sensors for calculating the azimuth and elevation angle of the local trajectory of the projectile.

11. The apparatus of claim 2 wherein the transducers of a sensor are spaced apart at least 3 cm.

12. The apparatus of claim 11 wherein the sensors are spaced apart at least 200 cm and up to 30 meters.

13. The apparatus of claim 1 wherein the sensors are substantially acoustically isolated from each other.

14. The apparatus of claim 2 wherein the transducers are substantially acoustically isolated from each other.

15. The apparatus of claim 1 wherein the sensors are mounted on a motorized vehicle, a gun, a rifle or a portable base.

16. The apparatus of claim 15 wherein the sensors are mounted on a tank.

17. The apparatus of claim 2 wherein the transducer is a piezoelectric crystal.

18. The apparatus of claim 17 wherein the crystals are mounted on an acoustic damping material.

19. A method for determining the trajectory of a supersonic projectile of unknown velocity and direction, comprising:
 (1) providing at least three spaced-apart sensors capable of encountering a shock wave generated by a supersonic projectile passing in the vicinity of the sensors and capable of generating signals in response to the shock wave, which signals are related to an azimuth and elevation angle of a unit sighting vector from each sensor to an origin of the shock wave;
 (2) calculating from the said signals the azimuth and elevation angle of a unit sighting vector from each sensor to the origin of the shock wave; and
 (3) calculating from the unit sighting vectors of each of the three sensors, the azimuth and elevation angle of the local trajectory of the projectile.

20. The method of claim 19 wherein the sensors have transducers which are sensitive to a shock wave propagated by a projectile.

21. The method of claim 20 including measuring the time lapses of the shock wave in passing the transducers of a sensor.

22. The method of claim 21 including measuring differences in time lapses of the shock wave in passing the transducers.

23. The method of claim 22 wherein the transducers are sensitive to the shock front of the shock wave.

24. The method of claim 19 wherein the sensors are sensitive to the shock wave and to an ambient density line and the length of the projectile is calculated from the time lapse of the passing of the shock wave and the ambient density line over a sensor.

25. The method of claim 20 wherein there are three transducers in each sensor.

26. The method of claim 25 wherein the transducers are arranged as an equilateral triangle.

27. The method of claim 19 wherein the at least three sensors are arranged so as to form a triangle.

28. The method of claim 19 wherein there is a plurality of more than three sensors and at least three sensors from the plurality of sensors are selected for calculating the azimuth and elevation angle of the trajectory of the projectile.

29. The method of claim 20 wherein the transducers of a sensor are spaced apart at least 3 cm.

30. The method of claim 19 wherein the sensors are substantially acoustically isolated from each other.

31. The method of claim 20 wherein the transducers are substantially acoustically isolated from each other.

32. The method of claim 29 wherein the sensors are spaced apart at least 200 cm and up to 30 meters.

33. The method of claim 19 wherein the sensors are mounted on a motorized vehicle, a gun, a rifle or a portable base.

34. The method of claim 33 wherein the sensors are mounted on a tank.

35. The method of claim 20 wherein the transducers are piezoelectric crystals.

36. The method of claim 35 wherein the crystals are mounted on an acoustic damping material.

* * * * *